United States Patent [19]
Kuchenbecker

[11] Patent Number: 5,611,012
[45] Date of Patent: Mar. 11, 1997

[54] OPTICAL FIBER PLUG-TYPE CONNECTOR

[75] Inventor: Thomas Kuchenbecker, Berlin, Germany

[73] Assignee: Siemens Aktiengesellschaft, Munich, Germany

[21] Appl. No.: 602,783

[22] PCT Filed: Aug. 25, 1994

[86] PCT No.: PCT/DE94/01004

§ 371 Date: Mar. 7, 1996

§ 102(e) Date: Mar. 7, 1996

[87] PCT Pub. No.: WO95/07479

PCT Pub. Date: Mar. 16, 1995

[30] Foreign Application Priority Data

Sep. 8, 1993 [DE] Germany ............... 43 30 941.0

[51] Int. Cl.⁶ .................................................. G02B 6/36
[52] U.S. Cl. .......................... 385/86; 385/77; 385/78; 385/80; 385/81; 385/87; 385/139
[58] Field of Search ............................. 385/53, 60, 62, 385/66, 70, 72, 77, 78, 80, 81, 84, 86, 87, 139

[56] References Cited

U.S. PATENT DOCUMENTS

| | | | |
|---|---|---|---|
| 4,362,356 | 12/1982 | Williams et al. | 385/80 X |
| 5,052,774 | 10/1991 | Bulman et al. | 385/86 |
| 5,058,984 | 10/1991 | Bulman et al. | 385/80 |
| 5,091,990 | 2/1992 | Leung et al. | 385/81 |
| 5,101,463 | 3/1992 | Cubukciyan et al. | 385/72 |
| 5,193,133 | 3/1993 | Schofield et al. | 385/85 |
| 5,222,169 | 6/1993 | Chang et al. | 385/87 |
| 5,428,703 | 6/1995 | Lee | 385/78 |
| 5,436,994 | 7/1995 | Ott et al. | 385/86 |
| 5,515,466 | 5/1996 | Lee | 385/78 |

FOREIGN PATENT DOCUMENTS

| | | | |
|---|---|---|---|
| 0491046 | 6/1992 | European Pat. Off. | 385/86 X |

*Primary Examiner*—Brian Healy
*Attorney, Agent, or Firm*—Kenyon & Kenyon

[57] ABSTRACT

A plug-type connector is provided for one end of a fiber-optic cable, which cable includes at least one optical fiber surrounded by a fiber sheath, a strand-type strain-relief element and a cable sheath. The plug-type connector includes a ferrule with a central longitudinal bore for receiving an unsheathed end of the optical fiber, a ferrule-holder for receiving a rear region of the ferrule, and a casing in which the ferrule-holder is mounted. The ferrule holder is axially movable in the casing against a restoring force. The ferrule-holder and the casing each include central openings through which the optical fiber and the fiber sheath are movable into the cable sheath. The casing includes a receiving space into which an end of the strain-relief element can be introduced and immobilized by adhesive bonding and/or sealing. The receiving space is separated in a liquid-tight manner from the central opening in the casing.

8 Claims, 1 Drawing Sheet

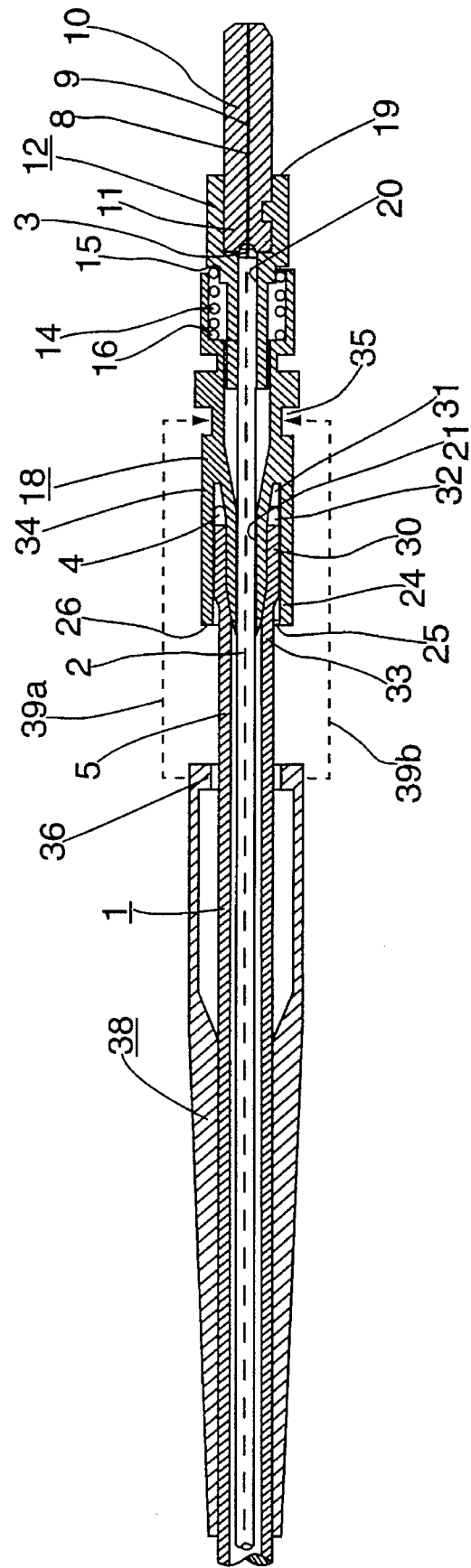

OPTICAL FIBER PLUG-TYPE CONNECTOR

FIELD OF THE INVENTION

The present invention concerns a plug-type connector for one end of a fiber-optic cable, which cable contains at least one optical fiber surrounded by a fiber sheath, a strand-type strain-relief element, and a cable sheath. The connector includes a ferrule having a central longitudinal bore to receive an unsheathed optical fiber end, a ferrule-holder that receives the rear ferrule region and is mounted in a casing so that it can move axially against a restoring force, central openings in the ferrule-holder and in the casing, through which the optical fiber and the fiber sheath can move back into the cable sheath, and means for fastening the strain-relief element at its end to the casing.

BACKGROUND OF THE INVENTION

A known plug-type connector of this kind disclosed in EP-A1-0 330 399 comprises a coupling end-piece for connecting an optical cable to, for example, a further optical cable or to an optoelectronic component. The cable comprises at least one cable sheath, a strand-type strain-relief element (for example, KEVLAR® fibers), and an optical fiber that is surrounded by a protective fiber sheath (buffer).

The optical fiber end toward the coupling extends in a central longitudinal bore of a ferrule. The rear end of the ferrule is held by a ferrule-holder that has a stop surface for one end of a helical spring. The other end of the helical spring is braced against one end surface of a rear (internal) casing part, so that the ferrule is mounted so that it can move axially against the spring force. The fiber sheath extends in central holes of the ferrule-holder and the casing. This design allows the fiber sheath to slide back into the cable sheath and into the strain-relief element when the ferrule slides back, so that the excess fiber length resulting from rearward movement of the ferrule does not lead to impermissibly high bending and kinking stresses on the fiber. In order to protect the fiber from axial tensile stresses, the end of the strain-relief element is fastened by crimping between a rearward extension of the casing and a separate sleeve. The casing must be manufactured of metal in order to absorb the radial forces produced thereby.

The known plug-type connector requires comparatively numerous sleeves, which require separate handling, and production-intensive, expensive metal casing parts and multiple production steps for secure fastening of the strain-relief element end. In a first assembly step the sleeve must be threaded onto the cable and, after the fiber has been immobilized in the ferrule, must be crimped to the extension of the casing.

In a plug-type connector disclosed by U.S. Pat. No. 4,984,865, a central opening of a ferrule-holder is filled with an adhesive or sealant, into which both an optical fiber and its fiber sheath, as well as the ends of a strand-type strain-relief element, are completely embedded. With this design, the ferrule with the optical fiber and the fiber sheath are not axially movable with respect to the strain-relief element.

OBJECTS AND SUMMARY OF THE INVENTION

An object of the present invention is to simplify the manufacture of a plug-type connector with respect to providing strain-relief.

This object is achieved, according to the invention, in a plug-type connector of the aforesaid type, by the fact that the casing has a receiving space for the strain-relief element; that the receiving space is separated in a liquid-tight manner from the central casing opening; and that the strain-relief element can be immobilized at its end in the receiving space by adhesive bonding and/or sealing. A substantial advantage of the invention is that the strain-relief element can be immobilized in the casing without additional individual parts. Adhesive bonding and/or sealing of the strain-relief element replaces crimping, which is problematic in terms of repeatability and exertion of force on the casing. As a result, the casing can be produced from more economical materials. The adhesive or sealant can be applied in advance into the receiving space and also into the entry region of the longitudinal bore in the ferrule, so that the optical fiber can be introduced into the longitudinal bore, and the strain-relief element into the receiving space, in a single threading-in operation, and subsequently immobilized. Light-curing materials are preferably used for this purpose. The liquid-tight separation between the receiving space and central opening of the casing prevents undesired wetting of the fiber sheath with adhesive or sealing compound, so that axial movability of the fiber sheath in the cable sheath is still ensured.

A development of the invention that is particularly advantageous in terms of introduction of the strain-relief element end into the receiving space is that the receiving space has an annular cross-section and terminates at the rear end surface of the casing. A conically tapering receiving space is advantageous for fastening of the strain-relief element end.

It is particularly advantageous in terms of production costs and material costs if the casing is an injection-molded plastic part.

Simple handling of the preassembled plug-type connector with adhesive and/or sealant already applied into the receiving space can be achieved since the end of the cable sheath closes off the receiving space in almost liquid-tight fashion.

According to an advantageous development of the invention, the fiber sheath can be slid back particularly well and far into the cable sheath, avoiding bending stresses on the optical fiber, if the inner wall of the receiving space extends at least partly into the cable sheath.

A further development of the invention that is preferred in terms of production engineering is that the casing has at least one depression into which a shaped part of a cable kink prevention bushing snaps.

An exemplary embodiment of the invention will be explained in more detail below, with reference to a Figure.

BRIEF DESCRIPTION OF THE DRAWING

The Figure is a cross-section view of a plug-type connector in accordance with the invention.

DETAILED DESCRIPTION

The Figure shows one end of an optical cable 1, which contains an optical fiber 3 surrounded by a protective fiber sheath 2 (buffer jacket), KEVLAR® fibers as strand-type strain-relief means 4, and a cable sheath 5. The cable can also be a hybrid cable that also contains electrical conductors in addition to the optical fiber. The unsheathed end 8 of the optical fiber 3 is received by a central bore 9 of a ferrule 10. Rear ferrule region 11 is injected into a plastic part that serves as a ferrule-holder 12. A helical spring 14 is braced at one of its ends against a shoulder 15 of the ferrule-holder 12, and at its other end against a front end surface 16 of an inner casing 18 (an injection-molded plastic part). The ferrule 10 can thus move axially backward relative to the casing 18, against spring force 14. Forward movement of the ferrule is limited by a further casing part, not depicted in the Figure, that has a stop for the end surface 19 of the ferrule-holder 12.

Fiber sheath 2 extends through a central bore 20 of ferrule-holder 12, and through a central opening 21 of the casing 18. Casing 18 has in rear region 24 a sealing cup in the form of a substantially hollow cylindrical, conically tapering receiving space 25, that is open toward rear end surface 26 of casing 18. The receiving space 25 is configured to be separated in liquid-tight fashion from central opening 21. One end 30 of cable sheath 5 introduced into the receiving space 25 closes it off from the outside in almost liquid-tight fashion, so that when the preassembled plug-type connector is handled, light-curable adhesive 31 applied into the deeper region of the receiving space 25 cannot run-out. The light wavelength of the adhesive 31 required for curing is matched to the light transmission of the cable sheath 5 and/or of the plastic used for casing 18.

One end 32 of the strain-relief element 4 is at least partly pulled back over the end 30 of the cable sheath 5. The inner wall 33 of the receiving space 25 extends considerably into cable sheath 5. This not only ensures improved axial movability of the fiber sheath 2 in the cable sheath 5, but also prevents wetting, which is undesired at that point, of the fiber sheath 2 by adhesive 31. Casing 18 has on its outer surface 34 a circumferential groove-shaped depression 35 into which snaps a shaped part 36 of a cable kink prevention bushing 38, that is slid onto casing 18 in accordance with arrows 39a, 39b indicated with dashed lines. Shaped part 36 includes a circumferential inward facing lip. The plug-type connector according to the invention can otherwise be constructed like the plug-type connector known from EP-A10 330 399; in particular, a further casing (outer casing), which receives (inner) casing 18, can be provided.

When the plug-type connector according to the invention is assembled, the ferrule 10 joined to the ferrule-holder 12, the spring 14, and the casing 18 (in the outer casing, for example) are first preassembled; the light-curing adhesive is applied into the receiving space 25 and in the rear region of longitudinal bore 9. The cable, prepared by partial removal of the fiber sheath and the cable sheath, is then threaded in a single production step, until the end 30 of the cable sheath 5 closes off the receiving space 25 in almost liquid-tight fashion. The depth of the receiving space 25 and the lengths of the fiber sheath 2 and the optical fiber end 8 are such that the fiber sheath end surface cannot bump against the ferrule 10. Then adhesive 31 in the receiving space 25 and in the bore 9 of the ferrule 10 are cured, preferably simultaneously, by exposure to light.

The plug-type connector according to the invention makes it possible to introduce the optical fiber into the ferrule and fasten the strand-type strain-relief element in a single procedure, with no need for mechanical fastening methods. The plug-type connector according to the invention comprises comparatively few individual parts, and can be produced in a few simple production steps.

I claim:

1. A plug-type connector for one end of a fiber-optic cable, which cable includes at least one optical fiber surrounded by a fiber sheath, a strand-type strain-relief element and a cable sheath, said plug-type connector comprising:

a ferrule with a central longitudinal bore for receiving an unsheathed end of the optical fiber;

a ferrule-holder for receiving a rear region of said ferrule;

a casing in which said ferrule-holder is mounted, said ferrule holder being axially movable in said casing against a restoring force, said ferrule-holder and said casing each including central openings through which the optical fiber and the fiber sheath are movable into the cable sheath; and means for fastening an end of the strain-relief element to the casing, including a receiving space in said casing into which the end of the strain-relief element can be introduced and immobilized by adhesive bonding and/or sealing, said receiving space being separated in a liquid-tight manner from the central opening in said casing.

2. The plug-type connector of claim 1, wherein the receiving space has a generally annular cross-section and terminates at a rear end surface of the casing.

3. The plug-type connector of claim 1, wherein the receiving space tapers conically.

4. The plug-type connector of claim 1, wherein the casing is an injection-molded plastic part.

5. The plug-type connector of claim 1, wherein the end of the cable sheath closes off the receiving space in substantially liquid-tight fashion.

6. The plug-type connector of claim 2, wherein an inner wall of the receiving space extends at least partly into the cable sheath.

7. The plug-type connector of claim 1, wherein the casing has at least one depression into which a shaped part of a cable kink prevention bushing can be snap fastened.

8. (New) A plug-type connector for one end of a fiber-optic cable, which cable includes at least one optical fiber surrounded by a fiber sheath, a strand-type strain-relief element and a cable sheath, said plug-type connector comprising:

a ferrule with a central longitudinal bore for receiving an unsheathed end of the optical fiber;

a ferrule-holder for receiving a rear portion of said ferrule; and a casing in which said ferrule-holder is mounted, said ferrule holder being axially movable in said casing against a restoring force, said ferrule-holder and said casing each including central openings through which the optical fiber and the fiber sheath are movable into the cable sheath, wherein said casing includes a receiving space into which an end of the strain-relief element can be introduced and immobilized by adhesive bonding and/or sealing, said receiving space being separated in a liquid-tight manner from the central opening in said casing.

\* \* \* \* \*